Feb. 5, 1957 E. A. HOBART 2,780,356
APPARATUS FOR SEPARATING MINERALS FROM SAND
Filed July 20, 1953 4 Sheets-Sheet 1
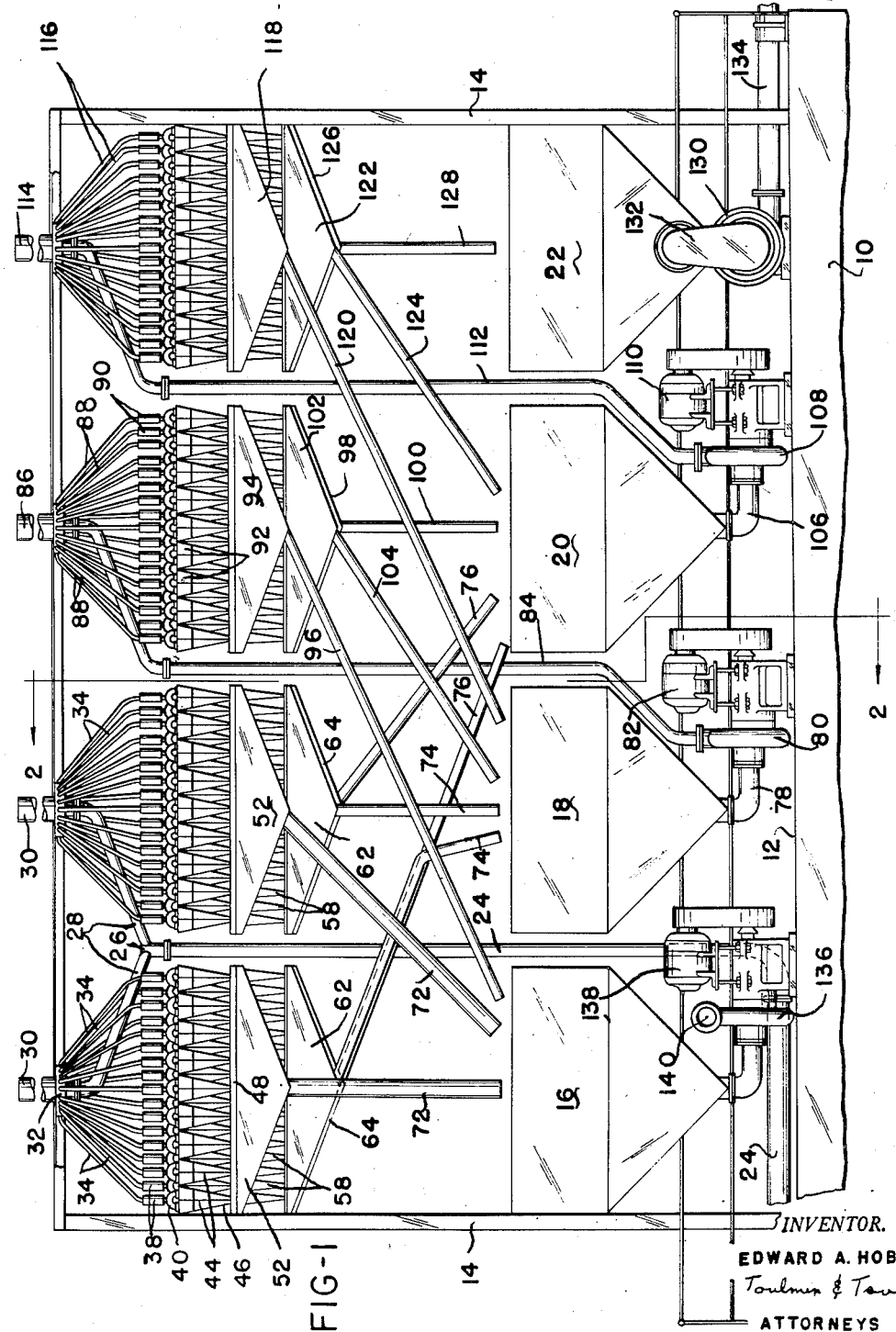
INVENTOR.
EDWARD A. HOBART
Toulmin & Toulmin
ATTORNEYS

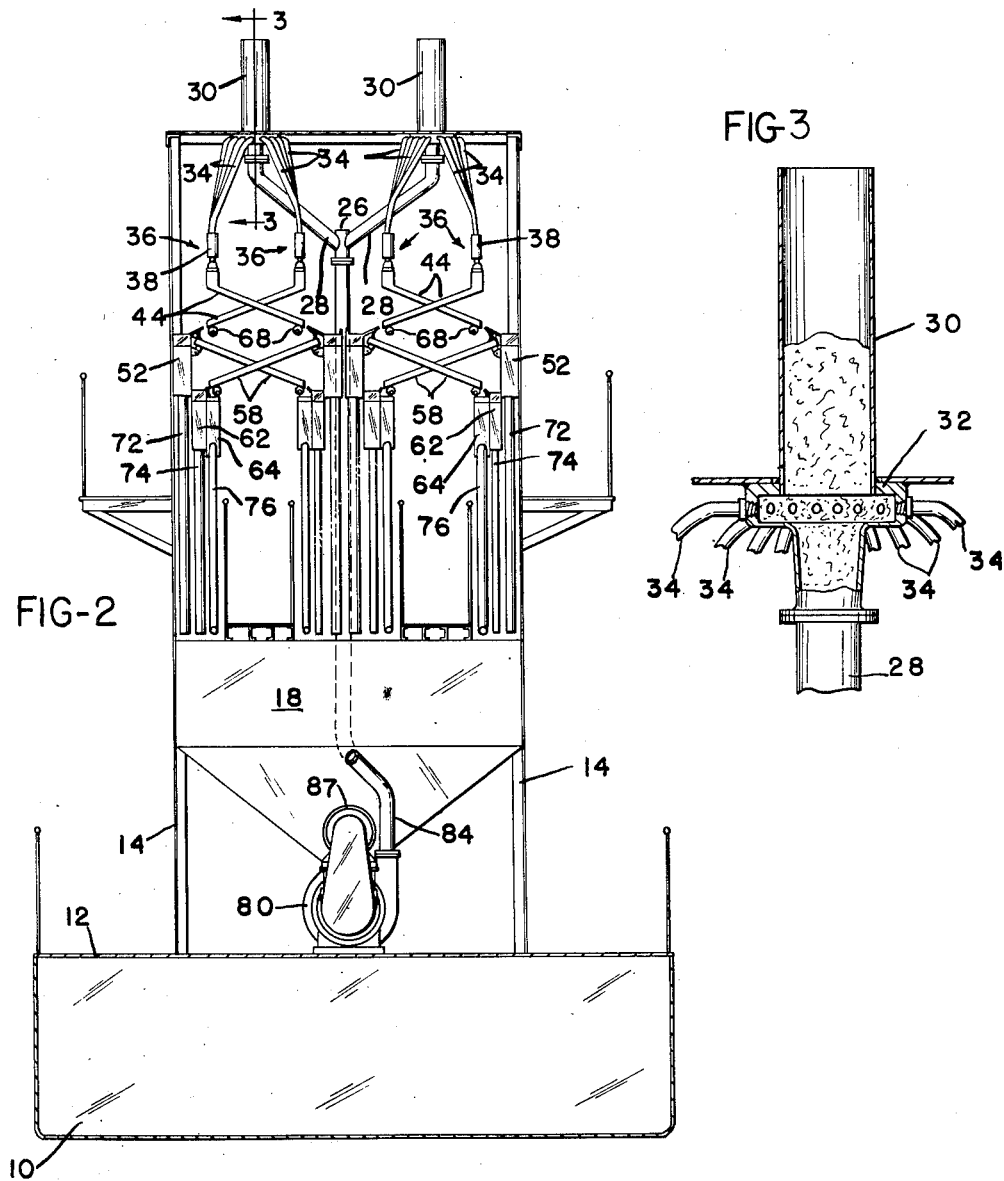

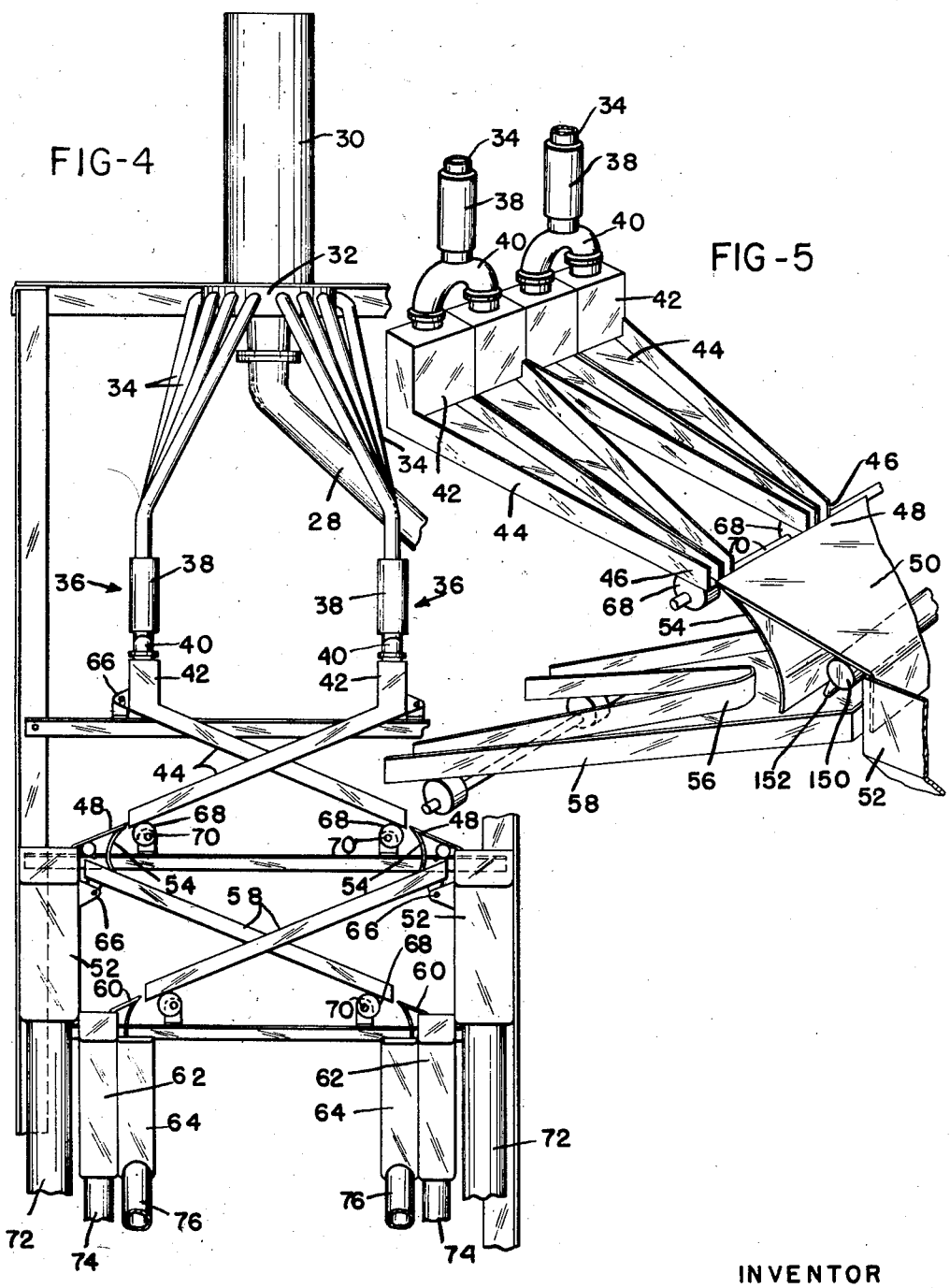

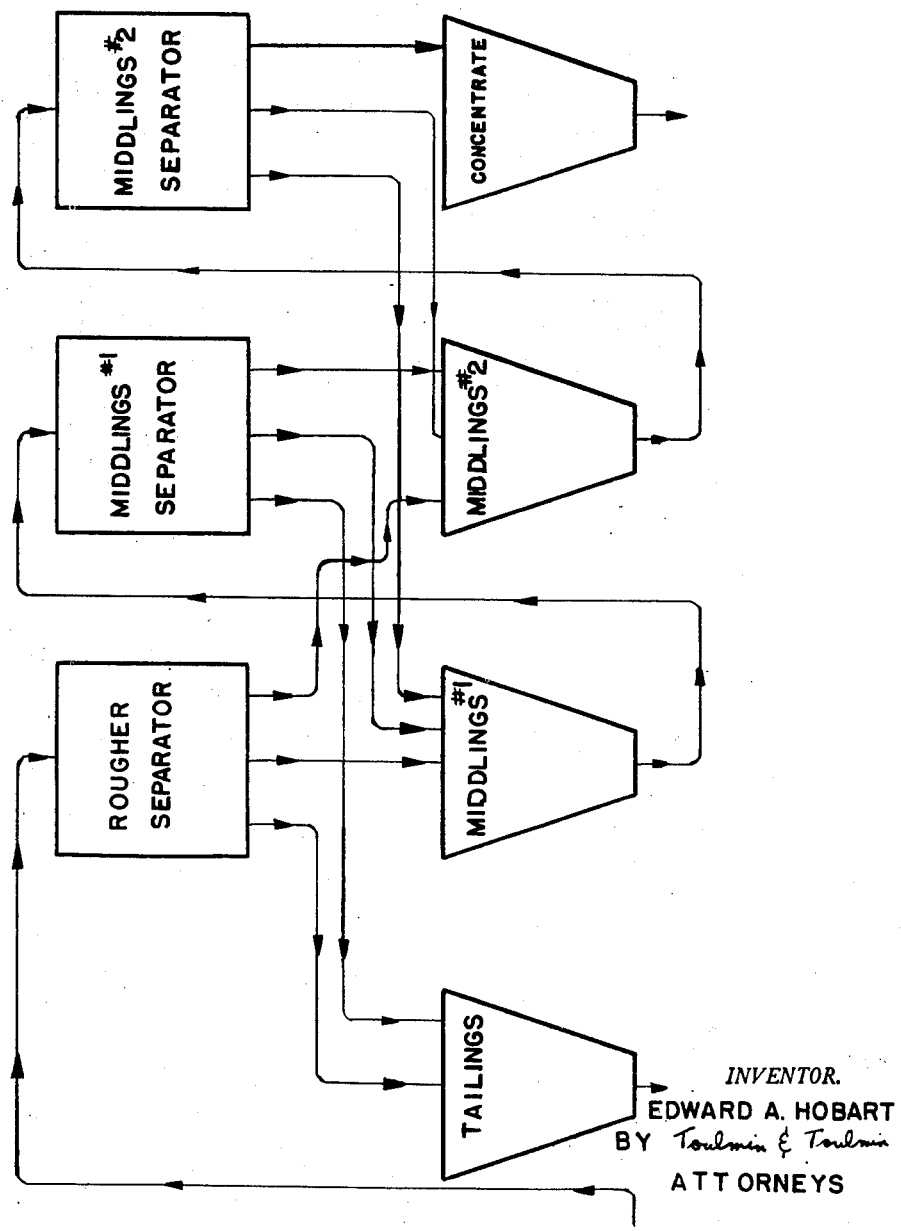

United States Patent Office 2,780,356
Patented Feb. 5, 1957

2,780,356

APPARATUS FOR SEPARATING MINERALS FROM SAND

Edward A. Hobart, Troy, Ohio, assignor to The Hobart Brothers Company, Troy, Ohio, a corporation of Ohio Application July 20, 1953, Serial No. 369,047

6 Claims. (Cl. 209—443)

This invention relates to a method and apparatus for separating and recovering valuable minerals from sand such as beach sand or sand that is removed from beneath water such as the ocean or in the bay or the like.

It has been found that many sand deposits, particularly beach or ocean sands, contain a fairly large percentage of valuable minerals, particularly titanium compounds which are valuable in commerce. Such sands also generally contain zircon and other minerals such as lencopane, rutile, monazite, and various silicates such as sillimanite, kyanite, staurolite, tourmaline and garnet. A characteristic of those minerals which are commercially desirable is that they are heavier than the bulk of the sand making up the mixture. The present invention has been devised to take advantage of this difference in specific gravity between the bulk of the sand and the minerals it is desired to recover in order to effect an efficient separation thereof.

Heretofore separation of such minerals from sand has been attempted in connection with dry mills having electrostatic and electromagnetic equipment for separating the materials utilizing their magnetic and electrical properties, and wet mills which tend to separate the minerals from the sand utilizing their difference in specific gravity. Neither of these methods have been successful in commercial practice.

Another type of concentrating plant, operating on the basis of the difference in specific gravity, has been more successful in effecting a separation of the sand from the minerals to be recovered, such as plants taking the form of large spiral concentrators in which the sand moves downwardly and about a spiral and has fractions removed therefrom at various points along the spiral. While this type of plant has been more satisfactory than those previously constructed, and has enabled the recovery of the minerals from the sand on a commercial basis, it is still possessed of a number of drawbacks and disadvantages.

In the first place, spiral concentrator plants are exceedingly bulky and are, accordingly, substantially immobile, thus requiring sand to be brought to the plant which sometimes involves a large transportation problem.

Another disadvantage in connection with spiral concentrator installations is that there is no arrangement for refluxing any of the material going through the separator or concentrator whereby additional separating operations are required after the minerals are removed from the spiral concentrators in order to arrive at a suitably concentrated mineral product.

Having the foregoing in mind, it is a primary object of the present invention to provide a method and apparatus for separating heavy minerals from sand such that a highly efficient separation of the minerals from the sand results.

A further object of this invention is to provide a method and apparatus for removing heavy minerals from sand such that in one and the same separating or concentrating apparatus the material being processed can be refluxed, whereby a highly efficient separating and concentrating cycle is obtained.

A still further object of this invention is the provision of an efficient concentrator or separator for deriving heavy minerals from sand which is compact, and which, therefore, can be arranged as a mobile unit, as by being built on a barge.

It is also an object of the present invention to provide a separator or concentrator for removing heavy minerals from sand which is capable of adjustment to adapt it to varying conditions, whereby it can be employed wtih various types of sand which might vary considerably in their mineral content.

These and other objects and advantages of this invention will become more apparent upon reference to the following specification taken in connection with the accompanying drawings, in which:

Figure 1 is a side elevational view showing a barge mounted separator or concentrator according to my invention;

Figure 2 is a transverse section through the barge mounted separator or concentrator indicated by line 2—2 on Figure 1;

Figure 3 is a vertical section drawn at enlarged scale indicated by line 3—3 on Figure 2;

Figure 4 is the portion of the machine at the upper left-hand side of Figure 2 drawn at an increased scale to show details of construction thereof;

Figure 5 is a fragmentary perspective view showing details of construction of the sand troughs, splitters, water supply pipes, and adjustments for varying the splitting action; and Figure 6 is a flow chart diagrammatically representing one condition of operation of the apparatus of this invention.

Referring to the drawings somewhat more in detail, as will be seen in Figures 1 and 2, I provide a barge 10 of relatively shallow draft upon which the apparatus, according to my invention, is mounted. This barge permits the apparatus to be moved to any desired location, thereby avoiding transportation problems and permitting the apparatus to be moved from a sand bed that has been exhausted when it becomes necessary.

The barge has mounted on its deck 12 a framework consisting of the upstanding structural members 14. These structural members are availed of for supporting a plurality of tanks or bins, of which 16 is a tailings tank, 18 is a first middlings tank, 20 is a second middlings tank, and 22 is a heads tank. The tailings tank 16 is for the purpose of receiving sand containing substantially no minerals of value and which is, therefore, delivered to discard. Middlings tanks 18 and 20 are for receiving sand containing an appreciable percentage of minerals, and which sand goes through separating operations in order to deliver to heads tank 22 the mineral concentrate it is desired to recover.

The sand to be concentrated is pumped to the apparatus by way of a conduit 24 by pumping means not shown. The sand which is delivered to the machine is in the form of a slurry of about 60% sand and 40% water, and as will hereinafter be seen the apparatus is arranged to handle about 200 tons of sand per hour and to separate therefrom a fraction containing about 8 tons of mineral, representing about 4% of the sand delivered to the machine. Conduit 24 extends upwardly within the framework of the apparatus to a fitting 26, and leading from fitting 26 is a plurality of conduits 28 which leads to a riser or header 30, of which there are four forming a part of the first stage of the apparatus, and which risers distribute the sand to be separated to the first splitting stations of the apparatus.

Reference to Figure 3 will serve to reveal that riser 30 at the base thereof includes a ring 32, to which are connected a plurality of conduits 34. It will be apparent that the described arrangement of the supply conduit 28, riser 30, apertured ring 32, and conduits 34 will lead to a substantially uniform supply of the slurry of sand and water being delivered through conduit 28 to the several conduits 34 with no tendency for the sand therein to settle out and accumulate in the riser 30.

The conduits 34 lead downwardly and outwardly from the rings 32 on each side of the machine to the several rows 36 of head boxes 38. Each head box 38, as will be seen in Figures 1, 4 and 5, has an inverted Y-shaped discharge conduit 40, and the lower ends of the conduits 40 communicate with the chambers 42 positioned at the upper ends of the inclined tapered troughs 44. The inclined troughs 44 taper downwardly to a relatively narrow discharge end 46, and positioned adjacent the discharge ends 46 of the troughs 44 is a stationary splitter member 48 presenting a relatively sharp edge towards the discharge ends of the troughs so that the slurry of sand and water flowing from the troughs is divided with a portion thereof going over the top surface 50 of the splitter members into a catch basin or the like 52, with the other portion of the sand being deflected by the curved inner face 54 of the splitter member and being delivered to the header 56 from which the inclined tapered troughs 58 extend.

Inclined tapered troughs 58 are quite similar in character to troughs 44 and, similarly, have at their lower discharge ends a splitting station consisting of a splitter member 60 of similar construction to the splitter member 48, and which splitter member serves to divide the sand slurry flowing from the lower ends of troughs 58 between the two catch basins 62 and 64.

In order to vary the manner in which the sand is split by the splitting members, the upper end of each of troughs 44 and 58 is rotatably supported as at 66, and the lower end of each of the said troughs is supported by the eccentric cam means 68, the said cam means being mounted on shafts 70 which are rotatably supported in the frame of the apparatus for manual adjustment.

As will be seen in Figures 1 and 2, the incoming slurry of sand and water delivered through conduit 24 is separated and delivered to four of the risers 30 so that on each side of the machine there are two groups of splitting stations of the nature described above handling the incoming slurry of sand and water.

As has been mentioned before, the fraction it is desired to recover from the sand is the heavier part thereof, thus at each splitting station the heavier fraction is collected for advancing to the next splitting station while the lighter fraction is either directed to the tailings tank or to an intermediate station for further processing.

In Figures 1 and 2 it will be noted that the lighter fraction in the first splitting station, which lighter fraction is delivered to the catch basin 52, is directed therefrom through the conduit 72 to the tailings tank 16, with the heavier fraction being directed on to the second splitting station.

In the second splitting station the lighter fraction is delivered to the catch basin 62, and this catch basin is connected by the conduit 74 with the first middlings tank 18. The heavier fraction in the second splitting station is directed to the catch basin 64, and this catch basin is connected by the conduit 76 with the second middlings tank 20.

The first middlings tank 18 has a conduit 78 leading from the bottom thereof to the inlet of a pump 80 driven by a motor 82, and the outlet of the pump is connected by a conduit 84 with a riser or header 86 substantially identical with the riser 30 previously described and forming a part of the second stage of the apparatus. Riser 86, similar to riser 30, communicates with a plurality of conduits 88 extending downwardly to a row of head boxes 90 communicating with the upper ends of inclined troughs 92, leading downwardly to a first splitting station wherein the slurry of sand and water delivered thereto is divided between a heavy and a light fraction, with the light fraction being delivered to a catch basin 94 connected by a conduit 96 with tailings 16, while the heavier fraction goes on to a second splitting station wherein the heavier fraction is delivered to a catch basin 98 connected by a conduit 100 with the second middlings tank 20, while the lighter fraction is delivered to a catch basin 102 connected by a conduit 104 with the first middlings tank 18.

It will be apparent that the lighter fraction in the first splitter station associated with riser 86 will be delivered back to tailings and then to discard, whereas, in the second splitting station the lighter fraction is delivered back to middlings tank 18 for refluxing with the heavier fraction being retained in middlings tank 20 together with the heavier fraction from the second splitting station of the first stage of the apparatus.

Middlings tank 20, similar to middlings tank 18, has a conduit 106 leading from the bottom thereof through a pump 108 driven by motor 110 to a conduit 112 leading to a riser or header 114 substantially identical with risers 86 and 30 and forming a part of the third stage of the apparatus. Riser 114 supplies the slurry of sand and water delivered thereto to a plurality of conduits 116 leading to a first splitting station, and wherein the lighter fraction is delivered to a catch basin 118 connected by a conduit 120 with the first middlings tank 18. The heavier fraction from the first splitting station associated with riser 114 is delivered to a second splitting station wherein the lighter fraction is delivered to a catch basin 122 from which it is delivered by a conduit 124 to the second middlings tank 20, while the heavier fraction passes to a catch basin 126 connected by a conduit 128 with the heads tank 22.

The heads tank 22 has a pump 30 connected therewith by a conduit 132 so that the heads can be delivered via a discharge conduit 134, either to a further treatment station or to a shipping point.

The tailings tank 16 likewise has a pump 136 connected therewith driven by a motor 138 for pumping the tailings out the discharge 140 of the pump to a point of discard.

In connection with the described apparatus, the tapering troughs leading to each splitting station are of merit in that the slurry to be split is presented to each splitting member in the form of a relatively thick stream and thus can be split with more accuracy than if the stream were delivered thereto in broad flat form. Furthermore, the tapering troughs tend to prevent the material from remaining in any fixed orientation of the particles thereof as it moves down the troughs and, instead, promotes the arrangement of the particles in the stream with the heavier particles at the bottom thereof and the lighter particles at the top, whereby efficient separation of the stream is had.

Inasmuch as there will be a tendency for the water in the slurry to separate out with the lighter fraction, I provide means for supplying additional water to the material being treated which can take the form of the supply pipe 150, see Figures 4 and 5, provided with nozzles 152 discharging additional water into the heavier fraction at the associated splitting station. It will be understood that such water would be added at any point in the apparatus, such as at the middlings tanks 18 and 20, if found necessary to maintain the slurry of the proper consistency.

For the purpose of diagrammatically illustrating a typical operative cycle, reference may be had to Figure 6 wherein it will be seen that the rougher separator, which corresponds to the splitting stations associated with the risers 30, is arranged to receive 200 tons of sand an hour in a mixture of 60% sand and 40% water. Assuming that each splitting station in the apparatus takes off 60% of the sand delivered thereto as a lighter fraction and passes 40% thereof on to the next stage as the heavier fraction, it will be seen that the rougher separator will deliver 120 tons an hour from the first splitting stations to the tailings tank 16 with 80 tons passing on from the first splitting station as the heavier fraction and being split at the second splitting station into 48 tons of lighter fraction that goes to the first middlings tank 18 and 32 tons of heavier fraction that goes to the second middlings tank 20.

The splitting and separating stages associated with the risers 86 and 114, and which are identified as the middlings 1 separator and middlings 2 separator, continue to divide the sand slurry with 60% thereof going off as the lighter fraction and 40% being passed on as the heavier fraction. In the splitting station associated with the riser 86, for example, there is a supply of 115.6 tons per hour which is split at the first splitting station so that 69.4 tons go to the tailings tank 16 with the heavier fraction being split at the second splitting station with 27.7 tons representing the lighter portion of the heavier fraction going back to the first middlings tank 18, while the heavier portion at the second splitting station, amounting to 18½ tons, goes on to the second middlings tank 20.

The supply from the second middlings tank 20 to riser 114 is 66.5 tons per hour, and at the first splitting station a fraction of 39.9 tons is taken off and delivered to first middlings tank 18, while at the second splitting station a lighter fraction of 15.9 tons is taken off as the lighter fraction and delivered to the second middlings tank 20, while the heavier fraction of 10.6 tons is delivered to the heads tank 22. This 10.6 tons delivered to the heads tank is the mineral concentrate recovered each hour from the 200 tons of sand delivered to the apparatus.

Assuming that the sand contains approximately 4% of valuable heavy minerals, it will be appreciated that the middlings in heads tank 22 is in a highly concentrated condition. It will also be appreciated that by refluxing the middling being treated through the second and third separating stages, I am enabled to arrive at this concentrate with a minimum of apparatus, which apparatus is sufficiently small to permit this arrangement as a mobile unit, such as the barge mounted unit which is illustrated in the drawings.

It will be understood that the specific example described in connection with Figure 6 is only exemplary of the many different cycles on which the apparatus could operate, and that the ratio between the heavy and light fractions could be individually adjusted at each splitting stage in order to control the character of the concentrate.

It will be understood that this invention is susceptible to modification in order to adapt it to different usages and conditions, and accordingly, it is desired to comprehend such modifications within this invention as may fall within the scope of the appended claims.

I claim:

1. In an apparatus of the nature described; a conduit for supplying a sand-water slurry, a vertical header open at the top and connected at its bottom end to said conduit to receive the slurry therefrom, a plurality of branch conduits leading from spaced points about the base of said header, a plurality of parallel inclined troughs receiving at their upper ends the slurry from said branch conduits and discharging the slurry at their lower ends in streams, a splitter member having a sharp edge presented to said streams to divide the stream into heavy and light fractions, means to adjust said splitter member and troughs relatively vertically, a catch basin to receive said light fraction from the splitter member, a second plurality of parallel inclined troughs to receive the heavy fraction from the splitter member at their upper ends in streams, said second plurality of troughs being beneath said first plurality of troughs and inclined in the opposite direction therefrom, said splitter member having its underneath surface concave so as to direct the heavy fraction from said first plurality of troughs into the upper ends of said second plurality of troughs, a second splitter member at the discharge end of said second troughs to split the streams therefrom into light and heavy fractions, and individual catch basins to receive the light and heavy fractions separately from said second splitting member.

2. In an apparatus of the nature described; first, second and third stages, each stage comprising a first splitting station wherein a sand-water slurry is divided into light and heavy fractions and a second splitting station wherein the heavy fraction from the first splitting station is divided into light and heavy fractions, whereby each stage produces light, heavy, and intermediate weight fractions, means to convey a slurry of sand and water through said stages in series, means to discard the light fraction from said first and second stages, means to receive the heavy fraction from the third stage, and means to reflux the intermediate fraction from said second stage and both the light and intermediate fractions from said third stage.

3. In an apparatus of the nature described; first, second and third stages, each stage comprising a first splitting station wherein a sand-water slurry is divided into light and heavy fractions and a second splitting station wherein the heavy fraction from the first splitting station is divided into light and heavy fractions, whereby each stage produces light, heavy, and intermediate weight fractions, means to convey a slurry of sand and water through said stages in series, means to discard the light fraction from said first and second stages, means to receive the heavy fraction from the third stage, means to convey the intermediate fraction from each of said second and third stages back to the inlet of the same stage from which it is delivered, and means to convey the light fraction from said third stage back to the inlet of said second stage.

4. In an apparatus of the nature described; first, second and third stages, each stage comprising a first splitting station wherein a sand-water slurry is divided into light and heavy fractions and a second splitting station wherein the heavy fraction from the first splitting station is divided into light and heavy fractions, whereby each stage produces light, heavy, and intermediate weight fractions, means to convey a slurry of sand and water through said stages in series, means to discard the light fraction from said first and second stages, means to receive the heavy fraction from the third stage, means to convey the intermediate fraction from each of said second and third stages back to the inlet of the same stage from which it is delivered, means to convey the light fraction from said third stage back to the inlet of said second stage, means for conveying the heavy fraction from said first stage to said third stage, and means for conveying the intermediate fraction from said first stage to said second stage.

5. In an apparatus of the nature described; first, second, and third stages, each stage comprising a header means, upper inclined trough means to receive slurry from said header and discharge it in a stream, a splitter member at the discharge end of the upper trough, means to split the stream therefrom into light and heavy fractions, lower inclined trough means to receive said heavy fraction and discharge it in a stream, a second splitter member at the discharge end of said lower trough means to split the stream therefrom into light and heavy fractions, catch basins to receive the light fraction from said first splitter member and the light and heavy fractions from said second splitter member, a tailings tank, first and second intermediate tanks and a heads tank, means for supplying a sand-water slurry to the header of said first stage, means for conveying slurry from said first and second intermediate tanks to the header of said second and third stages, respectively, and means connecting said catch basins for delivery to said tanks so there is a continuous flow of a heavy fraction of the slurry to said heads tank and a light fraction to said tailings tank and fractions of intermediate weight to said intermediate tanks.

6. In an apparatus of the nature described; first, second and third stages, each stage comprising a first splitting station wherein a sand-water slurry is divided into light and heavy fractions and a second splitting station wherein the heavy fraction from the first splitting station is divided into light and heavy fractions, whereby each stage produces light, heavy, and intermediate weight fractions, means to convey a slurry of sand and water through said stages in series, means to discard the light fraction from said first and second stages, means to receive the heavy fraction from the third stage, means to convey the intermediate fraction from said first and second stages to the inlet of said second stage and the intermediate fraction from the third stage back to the inlet of said third stage, means for conveying the heavy fraction from said first and second stages to the inlet of said third stage, and means associated with said splitting stations for adding water to said slurry to maintain it at a predetermined consistency.

References Cited in the file of this patent

UNITED STATES PATENTS

| | | |
|---|---|---|
| 276,534 | Hershey | Apr. 24, 1883 |
| 620,014 | Blacket | Feb. 21, 1899 |
| 650,138 | Smith | May 22, 1900 |
| 791,425 | Johnson | May 30, 1905 |
| 2,644,583 | Cannon | July 7, 1953 |